United States Patent
Brady et al.

(10) Patent No.: US 6,776,947 B2
(45) Date of Patent: Aug. 17, 2004

(54) PROCESS OF ADJUSTING WVTR OF POLYOLEFIN FILM

(75) Inventors: Kevin Arthur Brady, Cary, IL (US); John Jay Burnett, Houston, TX (US); Carol Lynn Klug, Wauconda, IL (US)

(73) Assignee: ExxonMobil Chemical Company, Baytown, TX (US)

( * ) Notice: Subject to any disclaimer, the term of this patent is extended or adjusted under 35 U.S.C. 154(b) by 0 days.

(21) Appl. No.: 08/690,136

(22) Filed: Jul. 31, 1996

(65) Prior Publication Data

US 2003/0071391 A1 Apr. 17, 2003

(51) Int. Cl.[7] .......................... B29C 47/88; B29C 55/18
(52) U.S. Cl. .................. 264/210.2; 264/288.8
(58) Field of Search ............................. 264/210.2, 154, 264/288.8, DIG. 47; 156/244.18; 428/156, 163, 174, 175, 181, 308.4, 315.9, 516, 500; 442/290, 398

(56) References Cited

U.S. PATENT DOCUMENTS

| | | | |
|---|---|---|---|
| 3,233,029 A | 2/1966 | Rasmussen | 264/288 |
| 4,116,892 A | * 9/1978 | Schwarz | 264/154 |
| 4,144,008 A | 3/1979 | Schwarz | 425/66 |
| 4,153,664 A | 5/1979 | Sabee | 264/289 |

(List continued on next page.)

FOREIGN PATENT DOCUMENTS

| | | |
|---|---|---|
| EP | 0 227 037 A2 | 7/1987 |
| EP | 0 288 021 A2 | 10/1988 |
| EP | 0 352 802 A | 1/1990 |
| EP | 0 598 970 A1 | 6/1994 |
| GB | 2115702 | 9/1983 |
| GB | 2 285 408 A | 7/1995 |
| GB | 2 151 53800 | 7/1995 |
| GB | 2 290 052 A | 12/1995 |
| JP | 64-49619 | * 2/1989 |
| WO | WO 95/03765 | 2/1995 |

OTHER PUBLICATIONS

Karen K. Leonas, Ph.D., Evaluation Of Five Nonwoven Surgical Gowns As Barriers To Liquid Strikethrough And Bacterial Transmission, INDA JNR, vol. 5, No. 2, pp. 22–26, (undated).

Database WPI, Section Ch, Derwent Pub. Ltd., London, GB; AN 74–00806V, XP002043546 & JP 48 060774 A (Seikisui Chem Co Ltd) see abstract, (Jan. 1974).

Database WPI, Section Ch, Week 8948, Derwent Pub. Ltd., London, GB; AN 89–353803, XP002043547 & JP 01 266 150 A (Showa Electric Wire Co Ltd), Oct. 24, 1989, see abastract.

ASTM International, Designation: E 96–00, "Standard Test Methods for Water Vapor Transmission of Materials" originally published 1994.

*Primary Examiner*—D. Lawrence Tarazano
(74) *Attorney, Agent, or Firm*—Moser, Patterson & Sheridan, LLP.

(57) ABSTRACT

A process for rendering films, film composites, and articles made therefrom less resistant to passage of water vapor by passing a filled precursor film or film composite through the nip of interdigitating grooved rollers. The films or film composites are generally formed using a precursor film of a film forming polyolefin or polyolefin blend, with a relatively high filler loading and optionally an elastomer. A process is disclosed for making diapers or other disposable items where a relatively high water vapor is coupled with a resistance to liquid strikethrough.

7 Claims, 1 Drawing Sheet

U.S. PATENT DOCUMENTS

| | | | | |
|---|---|---|---|---|
| 4,223,059 A | | 9/1980 | Schwarz | 428/198 |
| 4,289,832 A | | 9/1981 | Schwarz | 428/542 |
| 4,350,655 A | | 9/1982 | Hoge | 264/145 |
| 4,368,565 A | * | 1/1983 | Schwarz | 264/290.2 |
| 4,472,328 A | | 9/1984 | Sugimoto et al. | 264/41 |
| 4,517,714 A | | 5/1985 | Sneed et al. | 28/103 |
| 4,777,073 A | * | 10/1988 | Sheth | 264/288.4 |
| 4,791,144 A | | 12/1988 | Nagou et al. | 521/90 |
| 4,814,124 A | * | 3/1989 | Aoyama et al. | 264/41 |
| 4,921,653 A | | 5/1990 | Aoyama et al. | 264/41 |
| 4,929,303 A | * | 5/1990 | Sheth | 156/209 |
| 5,055,338 A | * | 10/1991 | Sheth et al. | 264/288.4 |
| 5,202,173 A | | 4/1993 | Wu et al. | 428/131 |
| 5,296,184 A | * | 3/1994 | Wu et al. | 264/154 |
| 5,549,777 A | * | 8/1996 | Langdon et al. | 156/244.18 |
| 5,575,785 A | * | 11/1996 | Gryskiewicz et al. | 604/385.2 |
| 5,865,926 A | * | 2/1999 | Wu et al. | 156/229 |
| H1955 H | * | 4/2001 | Middlesworth et al. | 524/427 |
| 6,258,308 B1 | * | 7/2001 | Brady et al. | 264/210.2 |
| H2000 H | * | 11/2001 | Middlesworth et al. | 156/244.11 |

* cited by examiner

PROCESS OF ADJUSTING WVTR OF POLYOLEFIN FILM

TECHNICAL FIELD

This invention relates generally a process of adjusting the water vapor transmission/porosity of films and film composites, while maintaining general resistance to liquid transmission (strikethrough). More specifically this invention is directed towards a process for producing films, film composites, and articles made therefrom, that are made permeable to water vapor, by passing them through interdigitating grooved rollers.

BACKGROUND

Polyolefin films which are rendered more permeable to water vapor using filler loading and orientation are known.

Such films or film composites are said to be more breathable, that is to have improved, increased permeability to water vapors, while maintaining a resistance to liquid strikethrough (defined herein). Uses of such films or film composites include on a diaper the permeability of which may permit the passage of moisture vapor and air, while substantially preventing the passage of liquid. The advantages of such a film used in a diaper are that after the wearer voids, the liquid is generally retained, while much of the liquid vapor can escape decreasing the "wet feeling", and lowering the possibility of uncomfortable diaper rash.

U.S. Pat. No. 4,472,328, assigned to Mitsubishi Chemical Industries, Ltd., suggests a breathable polyolefin film prepared from a polyolefin/filler composition having from 20 percent to 80 percent by weight of a filler such as a surface treated calcium carbonate. A liquid or waxy hydrocarbon polymer elastomer such as a hydroxyl-terminated liquid polybutadiene was purported to produce a precursor film that could be mono-axially or biaxially stretched to make a film breathable. The breathable film described by Mitsubishi is also described in Great Britain Patent No. 2,115,702, assigned to Kao Corporation. The Kao patent further describes a disposable diaper prepared with a breathable film as disclosed by the Mitsubishi patent. The breathable film is used as a backing for the diaper to contain liquid.

U.S. Pat. No. 4,350,655, assigned to Biax Fiber Film, describes a porous polyolefin film containing at least 50 percent by weight of a coated inorganic filler. The precursor film is formed without the addition of an elastomer by employing an inorganic filler surface coated with a fatty acid ester of only silicon or titanium. The precursor film is then rolled between horizontally grooved rollers. Cold stretching of the precursor film at a temperature below 70° C., produces a porous film. Some of the resulting films were stated to be both vapor and liquid permeable, however, at least one film (Example 3) was stated to be permeable to air.

U.S. Pat. No. 4,777,073 suggests a breathable film produced by stretching of a precursor film prepared from a polyolefin/filler composition. The document suggests that the permeability and strength, especially tear strength are improved by melt embossing the precursor film with a patterned melt embossing roller and stretching the film to impart a pattern of different film thickness having greater permeability within the areas of reduced thickness compared to the areas of greater thickness.

Most of these techniques require that a film or film composite be rendered breathable, regardless of the technique but generally through tentering (for transverse direction or TD orientation, and differential speeds of two rolls for machine direction or MD orientation), in a separate operation, prior to final construction of the end-use article, for instance the diaper, leading to expensive double processing or more expensive transport of the film rendered less dense by the tentering operation.

Therefore, a commercial need exists for a process that can be used to improve (increase) the film or film composite water vapor transmission rate (WVTR) at a commercially acceptable rate with existing commercial equipment, such that the disposable article will have relatively high water vapor transmission rates in all or part of the article, with good resistance to liquid permeability, while maintaining a sufficient level of physical strength to form a useful disposable article. A process for attaining such an article at relatively rapid, economical rate would be advantageous.

SUMMARY OF THE INVENTION

We have discovered that certain polyolefin films and film composites can be processed to have greater water vapor transmission rates, relatively low liquid strikethrough, while maintaining film integrity, by using certain film forming formulations and techniques and passing the film, the film composite and/or the finished fabricated disposable article, through a nip of at least one pair of interdigitating grooved rollers.

In certain embodiments of our invention a polyolefin film or film composite comprises at least one layer of a disposable article and is rendered breathable by passing the film, film composite or fabricated article through interdigitating grooved rollers. The film, film composite or fabricated article will have either a single layer or multilayer construction and the polyolefin/filler combination can be co-extruded, laminated or blended with other polymers or polymer based fabricated articles.

In an embodiment of our invention, a film ("precursor film") is made, utilizing a polyolefin or a polyolefin blend with a relatively higher filler loading, generally including embossing a pattern thereupon, such that its subsequent manipulation, either by itself, in a film composite or as a part of a disposable article, will render the film breathable (hereinafter defined as water vapor permeable, within certain limits of water vapor transmission rates (WVTR), while maintaining a certain level of liquid impermeability) while maintaining a minimum level of physical properties, elongation/tensile strength being of most importance. The manipulation of the film, film composite, and/or fabricated disposable article includes passing all or parts of the film, film composite, and/or fabricated disposable article through a grooved roller and/or interdigitating grooved rollers, at a rate sufficient to develop a minimum level of breathability to the film or film portion of the article, at a commercial and economical rate.

The tear strength, elasticity, and softness of a film prepared from the polyolefin/filler composition may be improved by addition of small amounts of an olefinic elastomer.

The WVTR desired is above 100 g/m$^2$/day@38° C., 90% RH preferably above 200 g, and can be easily greater than 1000 g/m$^2$/day.

BRIEF DESCRIPTION OF THE DRAWINGS

The foregoing aspects, features and advantages of the present invention will become clearer and more fully understood when the following detailed description, and appended claims are read in conjunction with the accompanying drawings, in which is a schematic drawing of an embodiment of our invention for imparting breathability to a film or film composite:

FIG. I is a schematic view of a process for converting a precursor film (and optionally other layers) into a film with greater WVTR.

Figure 1:
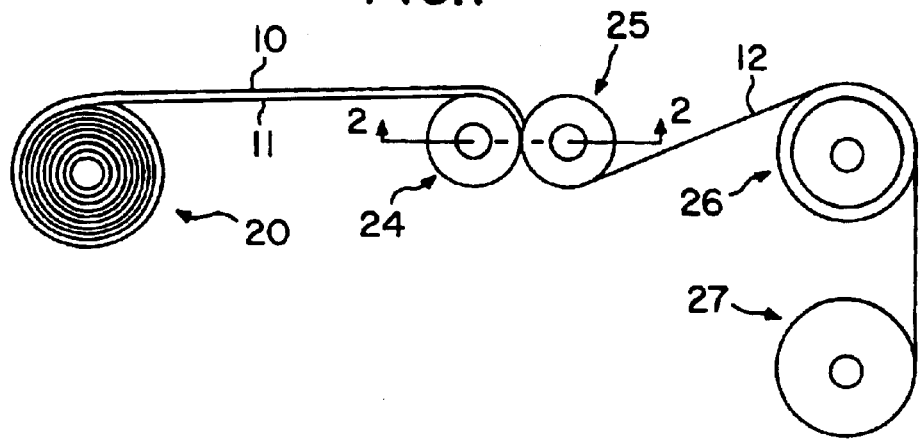

FIG. II illustrates a cross-sectional view of the interdigitating grooved rolls of FIG. I, taken along the lines 2—2.

FIG. III illustrates an enlarged view of area 3 from FIG. II showing several interdigitating teeth from the grooved rolls.

DETAILED DESCRIPTION

Introduction

High WVTR films, high WVTR film composites, and disposable articles made therefrom of our invention, are produced from a precursor film that is prepared from a polymer composition that comprises at least one polyolefin component, at least one filler component, and optionally an elastomeric component. The polyolefin component may be any polyolefin which is suitable for film formation such as homo or co-polymer polypropylene, homo or co-polymer polyethylenes or blends thereof. A preferred polyolefin is a copolymer of propylene and low density polyethylene, particularly preferred is linear low density polyethylene. The linear low density polyethylene may be a polymer made from either traditional Ziegler-Natta or metallocene catalysts, or combinations thereof In an embodiment of our invention the films, film composites, and articles made therefrom based on polyolefin filler combinations, when passed through a nip of interdigitating grooved rollers (hereinafter used interchangeably with "ring rolling") would surprisingly and unexpectedly have improved water vapor transmission rates while maintaining resistance to liquid permeability; and retaining film integrity. Following is a detailed description of certain preferred, films, film composites, and/or fabricated disposable articles made therefrom, within the scope of the present invention. Also disclosed are preferred methods of producing these films, film composites, and fabricated disposable articles made therefrom as well as preferred applications thereof. Those skilled in the art will appreciate that numerous modifications to these preferred embodiments can be made without departing from the scope of the invention. For example: through the properties of certain films, film composites, and fabricated articles such as diapers are exemplified, especially after ring-rolling, the films and composites will have numerous other uses. To the extent our description is specific, it is solely for the purpose of illustrating preferred embodiments of our invention and should not be taken as limiting the present invention to these specific embodiments.

It will be appreciated by those of ordinary skill in the art that the films and film composites of certain embodiments of the present invention, can be combined with other polymers or polymer based fabricated articles such as films, fibers, fabrics (including non-woven fabrics) and the like, depending on the intended function of the resulting film film composite or fabricated article.

As an example of such combinations, by extrusion coating, coextrusion coating, or by coextrusion or laminating of the film with other polymer films, e.g. polyolefin, other properties may be achieved. For instance, after ring-rolling an entire film cross-section, certain (machine direction) sections could be extrusion coated to eliminate breathability in those selected portions so coated. Also contemplated are varying combinations of the precursor film, or the film after ring-rolling, with other films, or non-woven fabrics, generally made from one or more polyolefins. Such combinations, while including the precursor or the post ring rolled film, can include several combinations, such as non-woven/film, film/non-woven, film/non-woven/film, film/film, and the like.

Other methods of improving WVTR of a film or article fabricated from the film, may be used in addition to use of the filled polyolefin and process of passing the filled polyolefin film through the nip of interdigitating grooved rollers described herein, without departing from the intended scope of my invention. For example, including microporous voids through pin-point punctures (also known as "aperatured film") to improve the WVTR, in addition to ringrolling is not excluded by the present invention. Also, it is well known that manipulation of a film by changing quench conditions during melt processing, and/or by irradiating the film will have an effect on WVTR and/or physical properties. Such mechanical or other treatment or manipulation is not excluded by this invention.

Films or film composites employing the polyolefin/filler blends of certain embodiments of the present invention can be oriented, annealed, or crosslinked Additionally, polyolefin/filler combinations of the present invention can be made into film by processes including blown or cast film manufacturing techniques. The blend components can function to modify barrier, opacity, sealing, cost, or other functions that will be known to those of ordinary skill in the art.

The films or composite structures are often used in infant diapers, toddler training pants, adult incontinence devices, medical drapes and apparel, such as surgical gowns, feminine hygiene articles, and the like. Use of the term "film composites" may include one or more film and/or non-woven layers bonded mechanically, thermally, or adhesively to the film. Such non-woven materials include spun-bonded-meltblown (SM), SMS, each individually. Such non-woven materials are most often made from polyolefins, such as homopolymer polyethylene, copolymer polyethylene (including one or more of $\alpha$-olefins of 4–10 carbon atoms, vinyl acetate, ethylincally unsaturated acrylic acid esters, acrylic acid, methacryclic acid, ionomers, polypropylene homopolymers, polypropylene copolymers including one or more of ethylene and $\alpha$-olefins of 4–10 carbon atoms, homopolymer and copolymer polypropylene).

Components of a Precursor Film

Film Forming Polyolefin

Most film forming polyolefins and combinations of film forming polyolefins may be used in embodiments of our invention.

Polyethylenes

Linear low density polyethylenes are among the materials favored in embodiments of our invention. Linear low density polyethylene (LDPE), generally that having density between 0.910 to 0.935 g/cc and a melt index from 0.01 to 10 dg/min. Another polyolefin that may be considered in such composites is very low density polyethylene (VLDPE, also plastomer) which will have densities in the range of from about 0.860 to about 0.910 g/cc. High density polyethylene (HDPE) having densities in the range of from about 0.935 to about 0.970 g/cc may also be considered. Such polyethylenes may be produced by copolymerizing ethylene with one or more $C_4$ to $C_{20}$ $\alpha$-olefin. Generally the preferred $\alpha$-olefins include those selected from the group consisting of butene-1, pentene-1,4-methyl-1-pentene, hexene-1, octene-1, decene-1 and combinations thereof. Most preferred are ethylene copolymers of butene-1, hexene-1, octene-1 and combinations thereof. The comonomers may be present in amounts up to 20 mole percent. The amount of comonomer or comonomers will generally determine density, for instance HDPE will have from 0 to 1 mole percent comonomer, while plastomers with densities lower than 0.900 g/cc will have up to 15 or even 20 mole percent comonomer(s). Such polyethylenes may be made utilizing traditional Ziegler-Natta, chromium based, metallocene (both alumoxane and ionic activators). Processes useful for preparing such polyethylenes include gas phase, slurry, solution and the like. The density of polyethylenes such as these, in preferred embodiments, will generally be in the range of from about 0.900 and 0.935 g/cm$^3$, preferably in the range of from about 0.910 to 0.925 g/cm$^3$, most preferably from about 0.915 to 0.920 gm/cm$^3$. The polyethylenes will have a melt index in the range of from about 0.1 to about 10 g/10 min, preferably 0.5 to 5 g/10 min., generally consistent with film forming conditions.

Polypropylene Component

Polypropylene may be used in conjunction with one or more polyethylenes, or by itself as the polyolefin component of the precursor film. Polypropylene may be made from many of the catalysts and processes discussed supra, including optional inclusion of one or more α-olefins.

Elastomeric Component

One or more elastomers may be included in the polyolefin component. Such elastomers include, but are not limited to natural rubber, ethylene alpha olefin rubber (EPM), ethylene, alpha olefin diene monomer rubber (EPDM), styrene-isoprene-styrene (SIS), styrene-butadiene-styrene (SBS), butyl rubber and the like. Of these SIS and SBS are preferred, with SBS more particularly preferred. The range of elastomer inclusion are generally between 5–40, preferably 5–30, more preferably 5–25 parts per hundred parts polyolefin.

Amounts of each component can vary with the desired properties for the precursor film or film composite. For instance, a nominal 0.917 g/cc density LLDPE may be combined with 15 parts of an elastomer per hundred parts of LLDPE. Such a combination might provide improved elastic behavior.

Other components in a film forming polyolefin are not excluded. Such components may include additives such as anti-oxidants, anti-static agents, colors and the like, well known to those of ordinary skill. Further, blending of polyolefins with polymers is also contemplated. For example, blending of traditional Z-N catalyzed, chromium catalyzed (CR), metallocene catalyzed (MCN) and free radical initiated (FR) polyolefins using one or all in a blend as the film forming component is contemplated. For instance including, but not limited to MCN/ZN, MCN/CR, MCN/R, MCN/ZN/FR, combinations and the like are contemplated. Other free radical initiated polyethylenes, high pressure polyethylene, ethylene homopolymers as well as ethylene copolymers may be included.

Both in the case of other polyolefins and the elastomeric polymers, the combinations should be generally formable into a film.

As used in this application, the term "polyolefin" will mean the polyolefin, any combination of polyolefins, elastomers, additives, and the like.

Filler Materials

To impart breathability to polyolefin films, addition of fillers and subsequent straining is known.

To form the precursor film, fillers may be incorporated at relatively high levels, limited only by the ability of the combination (polyolefin/filler) to be formed into a film. Further, it is believed that useful films may not be made with an amount of the filler in excess of about 250 parts filler per hundred parts polyolefin (pphp) (or polyolefin blend of the film forming composition. While at lower than about 20 pphp of filler, the polyolefin/filler composition may not have sufficient breathability. Higher amounts of filler may cause difficulty in compounding and losses in strength of the final breathable film. Generally, the range of filler may be in the range of from about 35 to about 200, preferably from in the range of from about 50 to about 150. The minimum amount of filler is needed to insure the interconnection within the film of voids created at the situs of the filler, particularly by the stretching operation to be subsequently performed Fillers useful in certain embodiments of our invention may be any inorganic or organic material or combinations thereof having a low affinity for and a significantly lower elasticity than the polyolefin component or the optional elastomeric component. Preferably the filler should be a rigid material having a non-smooth surface, or a material which is treated to render its surface hydrophobic. The mean average particle size of the filler is between about 0.5 to about 7 microns, preferably between 1 to about 5, more preferably from about 2 to about 3.5 microns. It should be understood that smaller particle sizes, such as 0.75 to 2, will provide the best balance of compoundability and eventual breathability, but there relative economics makes them generally less useful than particle sizes of 3 microns and above. Such particle sizes are preferred for films having a thickness of between 0.5–6 mils. Examples of the inorganic fillers include calcium carbonate, talc, clay, kaolin, silica diatomaceous earth, magnesium carbonate, barium carbonate, magnesium sulfate, barium sulfate, calcium sulfate, aluminum hydroxide, zinc oxide, magnesium oxide, calcium oxide, magnesium oxide, titanium oxide, alumina, mica, glass powder, zeolite, silica clay, and combinations thereof, and the like. Calcium carbonate is particularly preferred. The inorganic fillers such as calcium carbonate are preferably surface treated to be hydrophobic so that the filler can repel water to reduce agglomeration of the filler. Also, the surface coating should improve binding of the filler to the polymer while allowing the filler to be pulled away from the polyolefin when the film formed from the polyolefin/filler combination is stretched or oriented. Preferred coatings are stearates, such as calcium stearate, which are generally compliant with FDA regulations. Organic fillers such as wood powder, pulp powder, and other cellulose type powders may be used. Polymer powders such as Teflon® powder and Kevlar® powder may also be included. Combinations of these fillers are also contemplated.

Compounding of the Polyolefin/Filler Composition

Polyolefin/filler compositions usable in this invention may be compounded in several different ways. The components may be brought into intimate contact by, for example, dry blending these materials and then passing the overall composition through a compounding extruder. Alternatively, the polyolefin and filler components may be fed directly to a mixing device such as a compounding extruder, higher shear continuous mixer, two roll mill or an internal mixer such as a Banbury mixer. Overall, the objective is to obtain a uniform dispersion of the filler in the polymer without agglomeration, and this is readily achieved by inducing sufficient shear and heat to cause the polyolefin component to melt. However, time and temperature of mixing should be controlled as is normally done to avoid molecular weight degradation.

Film Extrusion and/or Embossing

The film forming composition (polyolefin/polyolefin blends and filler or fillers) may be manufactured into a precursor film by conventional tubular extrusion (blown bubble process) or by cast extrusion. Film formation by cast extrusion may be more convenient, as the film can be immediately melt embossed as described below.

In the cast extrusion process, the molten resin is extruded from an elongate die in the form of a web. The web may be pulled over at least one patterned embossing roller to chill and solidify the film with an embossed pattern for reasons discussed further below. The precursor film is may be produced to a gauge of between 0.5 to 6 mils, preferably from about 0.75 to about 5 mils, more preferably from about 1 to about 4 mils, most preferably from about 1.5 to about 3 mils, which allows for further stretching as described below. However, those of ordinary skill in the art will understand that many factors affect the response of the precursor film to the ring rolling process. It is our intent that the film or film part of a film composite will have breathability, and at least a minimum of physical properties to maintain its function, that is the film after ring rolling (either as part of a composite or by itself) should have the ability to perform its function. For instance in the side panel of a diaper, the film might even have substantial voids, providing excellent breathability, but having enough strength to maintain the physical form of the diaper or other article during its use.

The extrusion temperatures, die temperatures, and embossing roll (if used) temperatures will depend on the composition employed, but generally will be in the following ranges for compositions of the present invention prepared by cast extrusion:

| Melt Temperature (° F.) | 350–550 |
|---|---|
| Die Temperature (° F.) | 350–550 |
| Embossing Roll Temperature (° F.) | 50–130 |

Embossing may be used on the surface of polyolefin films to reduce gloss, although such will not be the films primary function in a ring rolling process. Embossing can be imposed on the precursor film surface at the time of the film fabrication for cast extrusion, or at a subsequent time for cast or tubular extrusion by procedures well known in the art. For the present invention, embossing may impose a pattern of different film thicknesses within the precursor film, and can be conducted with an micro/macro pattern, e.g. cross-hatching, dots, fines, circles, diamonds, hexagons, etc. The pattern can be either in line and/or off line and the rolls can be engraved with either pin up and/or pin down type configurations.

Use of the Precursor Film

Traditionally, breathable film has been made using such film precursors as described above, and then orienting the film by a variety of techniques, such as tentering in one or both of the machine direction (MD) or cross or transverse direction (TD). The oriented and breathable film could then be used for a variety of end use articles, such as diapers (usually back sheets, but also top sheets), feminine hygiene items, bandages, catamenial pads, panty liners, incontinent briefs, and the like. However, use of certain embodiments of the present invention will include the precursor film either by itself or a film composite in an interdigitating grooved roller process. By film composite, we intend that one or more additional layers or materials are added or laminated to the film. Such additional materials and layers include synthetic woven, synthetic non-woven, synthetic knit, non-woven, apertured film, macroscopically expanded three-dimensional formed film, filled compositions or laminates and/or a combination of these items. The non-wovens may be made by processes including, but not limited to spunlace, spunbond, meltblown, carded and or air-through or calendar bonded. The materials or layers of the composite can be combined by many method known to those of ordinary skill. For instance, adhesives (including spray adhesives, hot melt adhesives, latex based adhesives and the like), thermal bonding, ultra-sonic bonding, extrusion lamination, needle punching, and the like. For instance, in the manufacture of infant diapers, toddler training pants, adult incontinence devices, feminine hygiene items, medical gowns, medical drapes, and house wrap, parts or all of the final product may be assembled (by for instance heat or adhesive lamination) then the partial or finished construction is passed through one or more interdigitating pairs of rollers to render the precursor film high in WVTR.

Stretching

High WVTR film, film composites or fabricated articles made therefrom may achieved by stretching the precursor film to form interconnected voids prior to ring rolling. Stretching or "orientation" of the film may be carried out monoaxially in the machine direction (MD) or the transverse direction (TD) or in both directions (biaxially) either simultaneously or sequentially using conventional equipment and processes following cooling of the precursor film.

Blown films are preferably stretched in the machine direction or in both directions whereas cast films are preferably stretched in the transverse direction. For orientation in the MD, the precursor film is passed around two rollers driven at different surface speeds and finally to a take up roller. The second driven roller which is closest to the take up roll is driven faster than the first driven roller. As a consequence the film is stretched between the driven rollers.

Stretching of melt embossed precursor films either using both a tentering device and a directly in a ring rolling device or just the ring rolling device produces breathable films having the desired water vapor permeability. The resulting films had greater permeability in the areas of reduced thickness in comparison to the areas of greater thickness.

Although not thoroughly investigated, controlling of the strain on the film during stretching is believed to be important to controlling the WVTR. For stretching in the transverse direction, strain is controlled for a given stretch ratio by adjusting the film speed and the stretching distance. The stretching distance is measured, between the point where the film starts to increase in width to the closest point where the film is fully stretched. For stretching in the machine direction, strain is controlled for a given stretch ratio by controlling film speed and the gap between the first and second driven rollers.

A range of stretching ratios from 1:2 to 1:5 prove satisfactory for MD stretching with a ratio of 1:4 being preferred. A range of stretching ratios of 1:2 to 1:5 prove satisfactory for TD stretching with a ratio of 1:4 being preferred.

It is a further object of this invention to provide such a process for producing a barrier layer having high liquid strikethrough resistance.

The process of ring rolling also may activate the elasticity of the web (dependent upon specific ring rolling pattern used), in addition to imparting breathability to the web. Precursor webs containing elastomeric components add to the elasticity developed during the ring rolling process.

Ring Rolling Process

To illustrate the process the term web or webs are used. As used herein, the term web will include a precursor film and optionally one or more additional webs or layers, as discussed above, for instance one or more non-woven webs and/or one or more film webs. Such web components can be pre-assembled or laminated. Prior to ring rolling, at least one additional web may be added. Web 10 and alternatively 11 may be webs of a precursor film with either another film or fabric (11) the precursor film will have a thickness from 0.5 to 6 mils. For example, the second (11) web may be melt-blown webs of the type taught in the article entitled "Superfine Thermoplastic Fibers" by Van A. Wente, appearing in *Industrial Engineering Chemistry*, August, 1956, Vol. 48, No. 8 (pages 1342–1346). While melt-blown material may be nylon, polyester, or any polymer or polymer blend capable of being melt-blown, a melt-blown polypropylene web is preferred. A melt-blown web could comprise two or more zones of different melt-blown polymers. Melt-blown webs having a basis weight of up to about 30 $\mu m^2$ or greater can be used in the present invention, but lower weight webs are generally preferred in order to minimize the cost of the barrier layer produced therefrom. Technology provides for the production of melt-blown webs with a minimum basis weight of about 3 $g/m^2$, but available commercial melt-blown webs generally have a basis weight of 10 $\mu m^2$ or more. The preferred basis weight for optional web 11 is from about 10 $g/m^2$ to about 30 $g/m^2$; most preferably from about 10 $g/m^2$ to about 20 $g/m^2$. The density of melt-blown web 11 is preferably up to about 0.15 g/cc and most preferably up to about 0.1 g/cc. Webs 10 and 11 may be the same or different.

Figure 2:
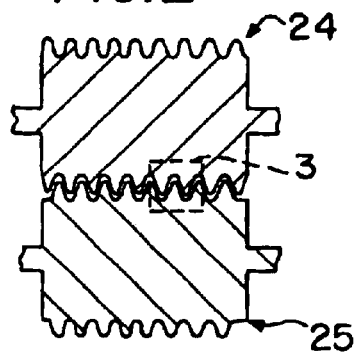

Web 10 and (when present) 11 have preferably been rolled up together as plies with adjacent surfaces on feed roll 20. They are unrolled from feed roll 20 retaining their contiguous relationship and passed into the nip of interdigitating grooved rolls 24 and 25. Grooved rolls 24 and 25 have grooves perpendicular to the axis of the rolls (parallel to the machine direction) as shown in FIG. 2 which is a sectional view of grooved rolls 24 and 25 taken along line 2—2 of FIG. 1.

It has been found that the web or webs (10 and optionally 11) will be stretched more uniformly with less tendency to tear the webs when interdigitating grooved rolls 24 and 25 are heated. The rolls are preferably heated such that their surface temperature are within the range of about 160° F. to 220° F.; more preferably within the range of 180° F. to 200° F. FIG. 1 shows a preferred arrangement of interdigitating grooved rolls 24 and 25 being located with their centers in a horizontal plane and webs 10 and 11 contacting the surface of roll 24 for about one-fourth of a revolution before entering the nip between rolls 24 and 25; this provides an opportunity for the web or webs 10 and 11 to be heated prior to entering the nip. However, interdigitating grooved rolls 24 and 25 could be positioned with their centers in a vertical plan or at any other angle and webs 10 and 11 could be fed directly into the nip of the rolls. Preheating of webs 10 and 11 if found to be necessary in order to avoid tearing of the webs, could be accomplished in any conventional manner.

The webs where two or more webs are fed is stretched and enmeshed while passing between the interdigitating grooved rolls 24 and 25 and are thus lightly bonded together producing final product 12. Where final improved WVTR composite film 12 has been stretched in the cross-machine direction by the grooved rolls 24 and 25 of FIGS. 1 and 2, a device such as a curved Mount Hope roll 26 or tenter clamps is needed to extend the now high WVTR film or film composite to its fullest width. The extended and smoothed film 12 is then rolled up on a takeup roll 27.

The amount of lateral stretch imparted to web plies by the grooved rolls 24 and 25 will depend on the shape and depth of the grooves of the rolls, and on the gap spacing between the rolls.

U.S. Pat. No. 4,223,059, issued to Eckhard C. A. Schwarz on Sep. 16, 1980 discloses interdigitating rolls having grooves of generally sine-wave shape cross-section which may be used for the present invention. U.S. Pat. No. 4,153,664 issued to Rinehardt N. Sabee on May 8, 1979, discloses the stretching of polymeric webs by ring-rolling with rolls having grooves with a variety of shapes. The shape of the grooves of the rolls will generally determine whether the web is stretched uniformly or at incremental, spaced portions of the web. Incremental stretching of the web is more likely to cause some local tearing of film or film composites which would damage the liquid strikethrough resistance of the film and, therefore, is not preferred for the present invention.

Figure 3:
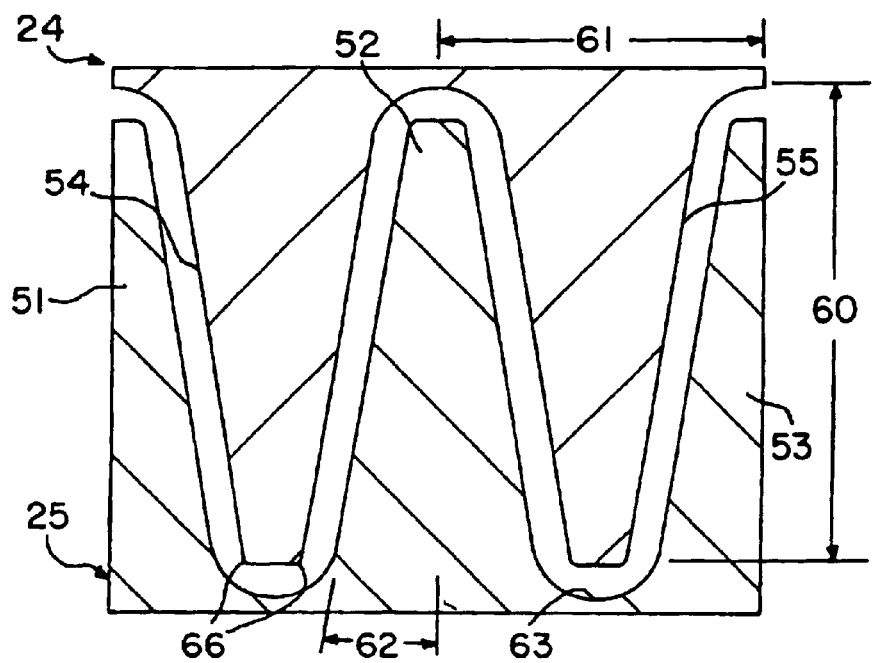

A preferred groove pattern for interdigitating rolls 24 and 25 is shown in FIG. 3 which is an enlarged view of area 3 of FIG. 2. FIG. 3 shows a partial cutaway view of interdigitating rolls 24 and 25. Teeth 54 and 55 of grooved roll 24 intermesh with teeth 51, 52 and 53 of grooved roll 25. The length 60 of the teeth is 3.81 mm., and the distance 61 between the centerlines of adjacent teeth on each roll is 2.54 mm. The teeth have generally straight sides which are at an angle 62 from a plane perpendicular to the axis of rolls 24 and 25 of 9' 17". The land at the base of the teeth has a radius 63 of 0.51 mm. Sharp corners 66 at the ends of the teeth are removed.

It is preferred that the interdigitating grooves of rolls 24 and 25 be perpendicular to the axis of the rolls. In this way, the maximum number of grooves of a given size will engage the web 10 and 11 at the same time and impact stretch to the webs. By having the maximum number of teeth engage the web at a given time, a more uniform stretching of the webs is achieved so that local tearing of the film or film composite is minimized. The stretched film 12 can be easily smoothed in the cross-machine direction.

A reproducible gap setting between grooved rolls 24 and 25 can be achieved by having the bearing of one of the grooved rolls, e.g. 24, stationary while those of the other grooved roll 25 can be moved in the horizontal direction. Groove roll 25 is moved in the horizontal direction. Groove roll 25 is moved toward roll 24 until its teeth are intermeshed with those of grooved roll 25 and it will move no further. The bearings of grooved roll 25 are then moved away from grooved roll 24 a measured distance, the gap setting. The preferred gap setting for practicing the present invention are from about 0.76 mm. to about 1.65 mm. With grooved rolls 24 and 25 having a tooth configuration as shown in FIG. 3 and described above, the maximum width of film or film composite layer 12 which can be 4 achieved for a single pass is about 2½ to 3 times the width of starting webs 10 and 11. By incising the gap between grooved rolls 24 and 25, the amount of lateral stretch imparted to webs 10 and 11 is decreased. Therefore, the width of film or film composite 12 compared to the width of starting web can be varied for a single pass between grooved rolls 24 and 25 from a maximum increase of 2½ to 3 times to no increase by the appropriate gap setting.

If it is desired to stretch the web more than can be achieved by a single pass between the grooved rolls, multiple passes between grooved rolls 24 and 25 can be used.

Basis weight is generally an important property desired to be controlled for film or film composite layer (total ring rolled web) 12. For cost reasons, the lightest film or film composite that will provide sufficient breathability is desired. A basis weight of the film produced by itself will be generally above 20 $g/cm^2$. The desired basis weight can be obtained by controlling the amount of stretch imparted to web 10 and optional web 11 by grooved rolls 24 and 25 as described above, and by the selection of the basis weights of the starting webs 10 and 11. For the present invention, starting webs 10 and 11 have a cumulative basis weight in the range of about 1.1 to 4 times the ultimate desired basis weight, preferably in the range of about 1.5 to 3 times the desired basis weight, most preferably about 2 times the desired basis weight. Correspondingly, the desired width of breathable film or film composite 12 can be achieved by selecting a proper combination of stretch imparted by the grooved rolls 24 and 25 and initial width of starting webs 10 and 11. For the present invention, the initial width of starting webs 10 and 11 before passing between grooved rolls 24 and 25 is within the range of about 0.9 to about 0.25 times the desired width, preferably within the range of about 0.7 to about 0.3 times the desired width, most preferably about 0.5 times the desired width.

Test Procedures

The test procedures used to determine the unique properties of the layers of the present invention and to provide the test results in the examples below are as follows:

Gurley Porosity

Teleyn Gurley Model 4190 Porosity Tester with sensitivity attachment is used. With the procedure as follows:

a) Cutting a strip of film (~2" wide) across the entire web width, b) Inserting a film sample to be tested between orifice plates, c) Setting the sensitivity adjustment on "5", d) Turning the inner cylinder so that the timer eye is vertically centered below the 10 cc silver step on the cylinder, e) Resetting the timer to zero, f) Pulling the spring clear of the top flange and releasing the cylinder, When the timer stops counting, the test is completed. The number of counts is multiplied by 10 and the resulting number is "Gurley seconds per 100 cc".

It will be appreciated by those of ordinary skill in the art that the films of m-polyethylene resins of certain embodiments of the present invention, can be combined with other materials, depending on the intended function of the resulting film.

Other methods of improving and/or controlling WVTR properties of the film or container may be used in addition to the methods described herein without departing from the intended scope of my invention. For example, mechanical treatment such as micro pores.

Liquid Column Strikethrough Resistance Test

The liquid strikethrough resistance test is a method for determining the water pressure in millimeters of water at which water penetrates a repellent barrier layer at a specified fill rate and with the water and barrier layer at a specified temperature. Such a test is described in INDA Journal, Vol. 5, No. 2, Karen K. Leon as; the strikethrough resistance of embodiments of our invention are from 50–500 cm.

EXAMPLES

Example 1–12

LLDPE/$CaCO_3$ films are made utilizing the following conditions, materials and equipment shown in Table 1.

Examples 1–12 used LL3003.09 (a 3 melt index 0.917 g/cc polyethylene (Z-N) available from Exxon Chemical Co., Houston, Tex.) examples: containing levels of $CaCO_3$ as shown in Table 1, blended with 100 parts of LL-3003.

Examples 13–16

Example 13–16 were made under the conditions shown in Table 1, examples 1–12, but with Exceed® ECD-112 a 3.4 MI, 0.917 g/cc density M-LLDPE from Exxon Chemical Co., Houston, Tex. with filler, master batch (MB) and elastomer levels as shown in Table 2.

Examples 1–4, 9, 10, 11, 12, 13, 14 and 15 were run on a Davis Standard cast line. Examples 9, 10, 11, 12, 14, and 15 were oriented in the TD, Example 9, 10, 11, 12, and 15 were further MD drawn. Examples 5, 6, 7, 8, and 16 were run on a blown film extruder.

Each film sample was run through various ring rolling apparatus as shown in Tables 2, 3, and 4, with the results for basis weight shown in Table 2, the results for WVTR in Table 3, the results for air porosity shown in Table 4.

While the present invention has been described and illustrated by reference to particular embodiments thereof it will be appreciated by those of ordinary skill in the art that the invention lends itself to variations not necessarily illustrated herein. For example, it is not beyond the scope of this invention to include additives with the claimed improved, high WVTR film process. For this reason, then, reference should be made to the appended claims and the remainder of the specification for purposes of determining the true scope of the present invention.

TABLE 1

| CONDITION | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| Material | A | B | B | B | C | D | E | F |
| Process | Cast/TDO | Cast | Cast | Cast | Blown | Blown | Blown | Blown |
| Ext. RPM | 17 | 6 | 8 | 11 | 45 | 65 | 65 | 61 |
| Screen PSI | 2600 | 2150 | 2380 | 2800 | 5290 | 6000 | 5730 | 6300 |
| Die PSI | 940 | 750 | 810 | 900 | N/A | N/A | N/A | N/A |
| Melt Temp. | 390 | 374 | 378 | 388 | 400 | 410 | 411 | 430 |
| Up Width | 23 | 28 | 28 | 28 | 9 | 11 | 11 | 11 |
| Down Width | 62.4 | N/A | N/A | N/A | N/A | N/A | N/A | N/A |
| FPM | 165 | 65 | 77 | 102 | 30 | 28 | 30 | 28 |
| MD Drawn | N/A | N/A | N/A | N/A | N/A | N/A | N/A | N/A |
| CONDITION | EXAMPLE 9 | EXAMPLE 10 | EXAMPLE 11 | EXAMPLE 12 | EXAMPLE 13 | EXAMPLE 14 | EXAMPLE 15 | EXAMPLE 16 |
| Material | G | B | H | B | B | B | B | E |
| Process | Cast/DO/MD Drawn | Cast/TDO/ MD Drawn | Cast/TDO/ MD Drawn | Cast/TDO/ MD Drawn | Cast | Cast/TDO | Cast/TDO/ MD Drawn | Blown |
| Ext. RPM | 15 | 21 | 15 | 22 | 19 | 19 | 19 | 35 |

TABLE 1-continued

| Screen PSI | 3600 | 3440 | 3138 | 3302 | 3740 | 3740 | 3740 | 4750 |
|---|---|---|---|---|---|---|---|---|
| Die PSI | N/A | N/A | N/A | N/A | 1270 | 1270 | 1270 | N/A |
| Melt Temp. | 414 | 402 | 390 | 350 | 430 | 430 | 430 | 425 |
| Up Width | 21 | 21 | 21 | 24 | 22 | 22 | 22 | 10 |
| Down Width | 83 | 77 | 82 | 89 | N/A | 63 | 63 | N/A |
| FPM | 181 | 195 | 186 | 140 | 340 | 340 | 340 | 25 |
| MD Drawn | 1:3 | 1:3 | 1:3 | 1:3 | N/A | N/A | 1:3 | N/A |

| MATERIAL | LLDPE | CaCO₃ | EVA | SBS |
|---|---|---|---|---|
| A | 63% | 37% | | |
| B | 50% | 50% | | |
| C | 40% | 40% | 8% | 12% |
| D | 35% | 35% | 12% | 18% |
| E | 30% | 30% | 16% | 24% |
| F | 40% | 40% | 20% | |
| G | 55% | 45% | | |
| H | 53% | 47% | | |

TABLE 2

BASIS WEIGHT (Grams/Square Meter)

| | | | PROPERTIES BEFORE ACTIVATION | | | PROPERTIES AFTER ACTIVATION | | | | |
|---|---|---|---|---|---|---|---|---|---|---|
| Example | **Mat Comp. | *Mfg. Meth. | Weight g/m2 | WVTR | Air Porosity Sec/100 cc | Type 1 Manual Stretch | Type 2 Ring Roll 0.400 DOE | Type 3 Ring Roll 0.175 DOE | Type 4 Ring Roll 0.100 DOE | Type 5 Tooth Pattern |
| 1 | A | AA | 22 | 1318 | >10000 | | DESTROYED | DESTROYED | 21 | N/A |
| 2 | B | BB | 79 | <100 | N/A | | 23 | N/A | N/A | N/A |
| 3 | B | BB | 86 | <100 | N/A | | 25 | N/A | N/A | N/A |
| 4 | B | BB | 108 | <100 | N/A | | 29 | N/A | N/A | N/A |
| 5 | C | CC | 53 | <100 | N/A | | | N/A | N/A | |
| 6 | D | CC | | <100 | N/A | | | N/A | N/A | |
| 7 | E | CC | 49 | <100 | N/A | | 21 | N/A | N/A | |
| 8 | F | CC | 54 | <100 | N/A | | | N/A | N/A | |
| 9 | G | DD | 18 | 8000 | 190 | | DESTROYED | | N/A | N/A |
| 10 | B | DD | 25 | 7000 | 300 | | DESTROYED | | N/A | N/A |
| 11 | H | DD | 20 | 6100 | 642 | | DESTROYED | | N/A | N/A |
| 12 | B | DD | 36 | 7100 | 898 | | DESTROYED | | N/A | N/A |
| 13 | B | BB | 73 | <100 | N/A | 29 | | | | |
| 14 | B | AA | 23 | 7900 | 210 | | | | | |
| 15 | B | DD | 21 | 8000 | 263 | 22 | | | | |
| 16 | B | CC | 22 | <100 | N/A | 11 | | | | |

*COMPOSITIONS OF RAW MATERIALS

| | LLDPE | CaCO₃ | EVA MB | SBS |
|---|---|---|---|---|
| A | 63% | 37% | | |
| B | 50% | 50% | | |
| C | 40% | 40% | 8% | 12% |
| E | 30% | 30% | 16% | 24% |
| F | 40% | 40% | 20% | |
| G | 55% | 45% | | |
| H | 53% | 47% | | |

**MANUFACTURING METHODS
AA  CAST/TDO
BB  CAST
CC  BLOWN
DD  CAST/TDO/MD DRAWN

TABLE 3

WATER VAPOR TRANSMISSION (gm/square Meter/24 hours)*

| | | | PROPERTIES BEFORE ACTIVATION | | | PROPERTIES AFTER ACTIVATION | | | | |
|---|---|---|---|---|---|---|---|---|---|---|
| Example | **Mat Comp. | *Mfg. Meth. | Weight g/m2 | WVTR | Air Air Porosity Sec/100 cc | Type 1 Manual Stretch | Type 2 Ring Roll 0.400 DOE | Type 3 Ring Roll 0.175 DOE | Type 4 Ring Roll 0.100 DOE | Type 5 Tooth Pattern |
| 1 | A | AA | 22 | 1318 | >10000 | | DESTROYED | DESTROYED | 750 | N/A |
| 2 | B | BB | 79 | <100 | None | | 1300 | N/A | N/A | N/A |
| 3 | B | BB | 86 | <100 | None | | 1300 | N/A | N/A | N/A |
| 4 | B | BB | 108 | <100 | None | 1600 | 1100 | N/A | N/A | N/A |
| 5 | C | CC | 53 | <100 | None | 400 | 360 | N/A | N/A | 800 |
| 6 | D | CC | | <100 | None | 200 | 350 | N/A | N/A | 400 |

TABLE 3-continued

| | | | | | | | | | | |
|---|---|---|---|---|---|---|---|---|---|---|
| 7  | E | CC | 49  | <100 | None | 200 | 290 | N/A | N/A | 200 |
| 8  | F | CC | 54  | <100 | None | 200 | 240 | N/A | N/A | 450 |
| 9  | B | DD | 18  | 8000 | 190  |     | DESTROYED | 7100 | N/A | N/A |
| 10 | B | DD | 25  | 7000 | 300  |     | DESTROYED | 9200 | N/A | N/A |
| 11 | B | DD | 20  | 6100 | 642  |     | DESTROYED | 9000 | N/A | N/A |
| 12 | B | DD | 36  | 7100 | 898  | 6900 | DESTROYED | 7850 | N/A | N/A |
| 13 | B | BB | 73  | <100 | N/A  | 1400 | | | | |
| 14 | B | AA | 23  | 7900 | 210  | 6400 | | | | |
| 15 | B | DD | 21  | 8000 | 263  | 7350 | | | | |
| 16 | B | CC | 22  | <100 | N/A  | 2600 | | | | |

*@ 38° C., 90% RH
*COMPOSITIONS OF RAW MATERIALS

|   | LLDPE | CaCO₃ | EVA MB | SBS |
|---|---|---|---|---|
| A | 63% | 37% | | |
| B | 50% | 50% | | |
| C | 40% | 40% | 8%  | 12% |
| E | 30% | 30% | 16% | 24% |
| F | 40% | 40% | 20% | |

**MANUFACTURING METHODS
AA  CAST/TDO
BB  CAST
CC  BLOWN
DD  CAST/TDO/MD DRAWN

TABLE 4

AIR POROSITY (Seconds/100 cc/Square Inch)

| Example | **Mat Comp. | *Mfg. Meth. | Weight g/m2 | WVTR | Air Porosity Sec/100 cc | Type 1 Manual Stretch | Type 2 Ring Roll 0.400 DOE | Type 3 Ring Roll 0.175 DOE | Type 4 Ring Roll 0.100 DOE | Type 5 Tooth Pattern |
|---|---|---|---|---|---|---|---|---|---|---|
| 1  | A | AA | 22  | 1318 | >10000 |     | DESTROYED | DESTROYED | >10000 | N/A |
| 2  | B | BB | 79  | <100 | N/A    |     | 4165      | N/A       | N/A    | N/A |
| 3  | B | BB | 86  | <100 | N/A    |     | 9966      | N/A       | N/A    | N/A |
| 4  | B | BB | 108 | <100 | N/A    |     | 5685      | N/A       | N/A    | N/A |
| 5  | C | CC | 53  | <100 | N/A    |     | >10000    | N/A       | N/A    | 890 |
| 6  | D | CC |     | <100 | N/A    |     | >10000    | N/A       | N/A    | 6320 |
| 7  | E | CC | 49  | <100 | N/A    |     | >10000    | N/A       | N/A    | >10000 |
| 8  | F | CC | 54  | <100 | N/A    |     | >10000    | N/A       | N/A    | 640 |
| 9  | B | DD | 18  | 8000 | 190    |     | DESTROYED | 33        | N/A    | N/A |
| 10 | B | DD | 25  | 7000 | 300    |     | DESTROYED | 48        | N/A    | N/A |
| 11 | B | DD | 20  | 6100 | 642    |     | DESTROYED | 5         | N/A    | N/A |
| 12 | B | DD | 36  | 7100 | 898    |     | DESTROYED | 17        | N/A    | N/A |
| 13 | B | BB | 73  | <100 | N/A    |     |           |           |        |     |
| 14 | B | AA | 23  | 7900 | 210    |     |           |           |        |     |
| 15 | B | DD | 21  | 8000 | 263    | 258 |           |           |        |     |
| 16 | B | CC | 22  | <100 | N/A    |     |           |           |        |     |

*COMPOSITIONS OF RAW MATERIALS

|   | LLDFE | CaCO₃ | EVA MB | SBS |
|---|---|---|---|---|
| A | 63% | 37% | | |
| B | 50% | 50% | | |
| C | 40% | 40% | 8%  | 12% |
| E | 30% | 30% | 16% | 24% |
| F | 40% | 40% | 20% | |

**MANUFACTURING METHODS
AA  CAST/TDO
BB  CAST
CC  BLOWN
DD  CAST/TDO/MD DRAWN

We claim:

1. A process for producing a breathable film composite, comprising the steps of:

providing a film composite having at least a first layer and a second layer, the first layer comprising a polyolefin film, the polyolefin him comprising a polyolefin composition with a filler concentration in a range of from about 16.5 wt % to about 71.5 wt % of the polyolefin composition, the second layer comprising a material selected from the group consisting of woven fabric, non-woven fabric, knit fabric, and combinations thereof; and simultaneously passing the first layer and the second layer between at least one pair of interdigitating grooved rollers having a surface temperature of from 160° F. to 220° F. to produce a film composite having a WVTR greater than 200 g/m²/day at 38° C. and 90% relative humidity.

2. The process of claim 1 wherein the step of passing the layers between at least one pair of interdigitating grooved rollers further comprises contacting the composite with the surface of one of the interdigitating grooved rollers that has been heated in the range of from 160° F. to 220° F. for at least one-fourth of a revolution before entering the nip between the pair oh interdigitating grooved rollers providing for heating of the precursor film before entering the nip of the rollers.

3. The process of claim 1 wherein the initial basis weight (weight/area) of the precursor film is from 1.5 to 3 times the basis weight of the film after stretching.

4. The process of claim 1 further comprising the step of ensuring that the film composite is at least 160° F. as it enters a nip of the at least one pair of interdigitating grooved rollers.

5. The process of claim 1 further comprising the step of preheating the film composite to at least 160° F. before passing it through the at least one pair of interdigitating grooved rollers.

6. The process of claim 1 wherein the WVTR is greater than 1000 $g/m^2/day$ at 38° C. and 90% relative humidity.

7. The process of claim 1 wherein in the step of providing a film composite, at least the first layer is embossed to impose thereon a pattern of multiple film thickness.

* * * * *